United States Patent

Buschur et al.

[11] Patent Number: 6,021,641
[45] Date of Patent: Feb. 8, 2000

[54] HYDRAULICALLY POWERED FAN SYSTEM FOR VEHICLES

[76] Inventors: Jeffrey J. Buschur; John S. Hill, both c/o ITT Automotive Electrical Systems, Inc. 2040 Forrer Blvd., Dayton, Ohio 45420

[21] Appl. No.: 08/800,996

[22] Filed: Feb. 20, 1997

Related U.S. Application Data

[63] Continuation-in-part of application No. 08/680,482, Jul. 15, 1996, Pat. No. 5,669,461, which is a continuation of application No. 08/400,927, Mar. 9, 1995, Pat. No. 5,535,845.

[51] Int. Cl.[7] .................................................. F16D 31/02
[52] U.S. Cl. ............................... 60/425; 60/456; 60/468; 60/912
[58] Field of Search .............................. 60/425, 426, 456, 60/483, 912, 422, 468

[56] References Cited

U.S. PATENT DOCUMENTS

| | | | |
|---|---|---|---|
| B 535,386 | 1/1976 | Eftefield | 60/425 |
| 2,500,627 | 3/1950 | Chinn | 60/425 |
| 2,585,348 | 2/1952 | Robinson | 60/425 |
| 3,641,879 | 2/1972 | Week et al. . | |
| 3,664,129 | 5/1972 | Schwab | 60/468 |
| 4,005,636 | 2/1977 | Dunn . | |
| 4,043,419 | 8/1977 | Larson et al. . | |
| 4,075,840 | 2/1978 | Jesswein . | |
| 4,130,990 | 12/1978 | Amedei . | |
| 4,144,946 | 3/1979 | Melocik . | |
| 4,174,018 | 11/1979 | Liebert et al. . | |
| 4,179,888 | 12/1979 | Goscenski, Jr. . | |
| 4,189,919 | 2/1980 | Goscenski, Jr. . | |
| 4,206,689 | 6/1980 | Peterson . | |
| 4,223,646 | 9/1980 | Kinder . | |
| 4,343,151 | 8/1982 | Lorimor . | |
| 4,410,058 | 10/1983 | Dymond . | |
| 4,414,809 | 11/1983 | Burris . | |
| 4,420,934 | 12/1983 | Udono | 60/422 |
| 4,446,697 | 5/1984 | Goscenski, Jr. . | |
| 4,463,557 | 8/1984 | Miller et al. . | |
| 4,470,259 | 9/1984 | Miller et al. . | |
| 4,488,569 | 12/1984 | Rau . | |
| 4,556,078 | 12/1985 | Wittren . | |
| 4,625,751 | 12/1986 | Gage . | |
| 4,664,210 | 5/1987 | Yamaoka et al. . | |
| 4,738,330 | 4/1988 | Suzuki et al. . | |
| 4,798,050 | 1/1989 | Nakamura et al. | 60/468 |
| 4,941,437 | 7/1990 | Suzuki et al. | 60/468 |
| 4,966,066 | 10/1990 | Kauss et al. . | |
| 5,293,952 | 3/1994 | Ledamoisel et al. . | |
| 5,398,505 | 3/1995 | Oogushi et al. . | |
| 5,471,908 | 12/1995 | Lech . | |
| 5,487,403 | 1/1996 | Mollo . | |
| 5,561,978 | 10/1996 | Buschur | 60/483 |
| 5,584,640 | 12/1996 | Johnson | 60/425 |
| 5,687,568 | 11/1997 | Buschur | 60/483 |

FOREIGN PATENT DOCUMENTS

| | | |
|---|---|---|
| 0042682 | 6/1981 | European Pat. Off. . |
| 3626013 | 9/1987 | Germany . |
| 62-282110 | 12/1987 | Japan . |
| 63-141878 | 6/1988 | Japan . |
| 03179133 | 12/1989 | Japan . |
| 1522014 | 8/1978 | United Kingdom . |
| 7901084 | 4/1979 | WIPO . |
| 9616259 | 5/1996 | WIPO . |

OTHER PUBLICATIONS

"Hydraulic Multierbrauchersusteme", *Technische Rundschan*, No. 13, Mar. 29, 1983.

Primary Examiner—F. Daniel Lopez
Attorney, Agent, or Firm—J. Gordon Lewis

[57] ABSTRACT

A hydraulically powered fan system for the cooling system of a vehicle. Two hydraulic motors, powered by a hydraulic pump, drive a common fan which cools a radiator. When hydraulic flow in excess of that required to power a single motor is present, a second motor is placed in parallel with the single motor, thereby reducing system pressure, and reducing the power consumed by the pump.

13 Claims, 14 Drawing Sheets

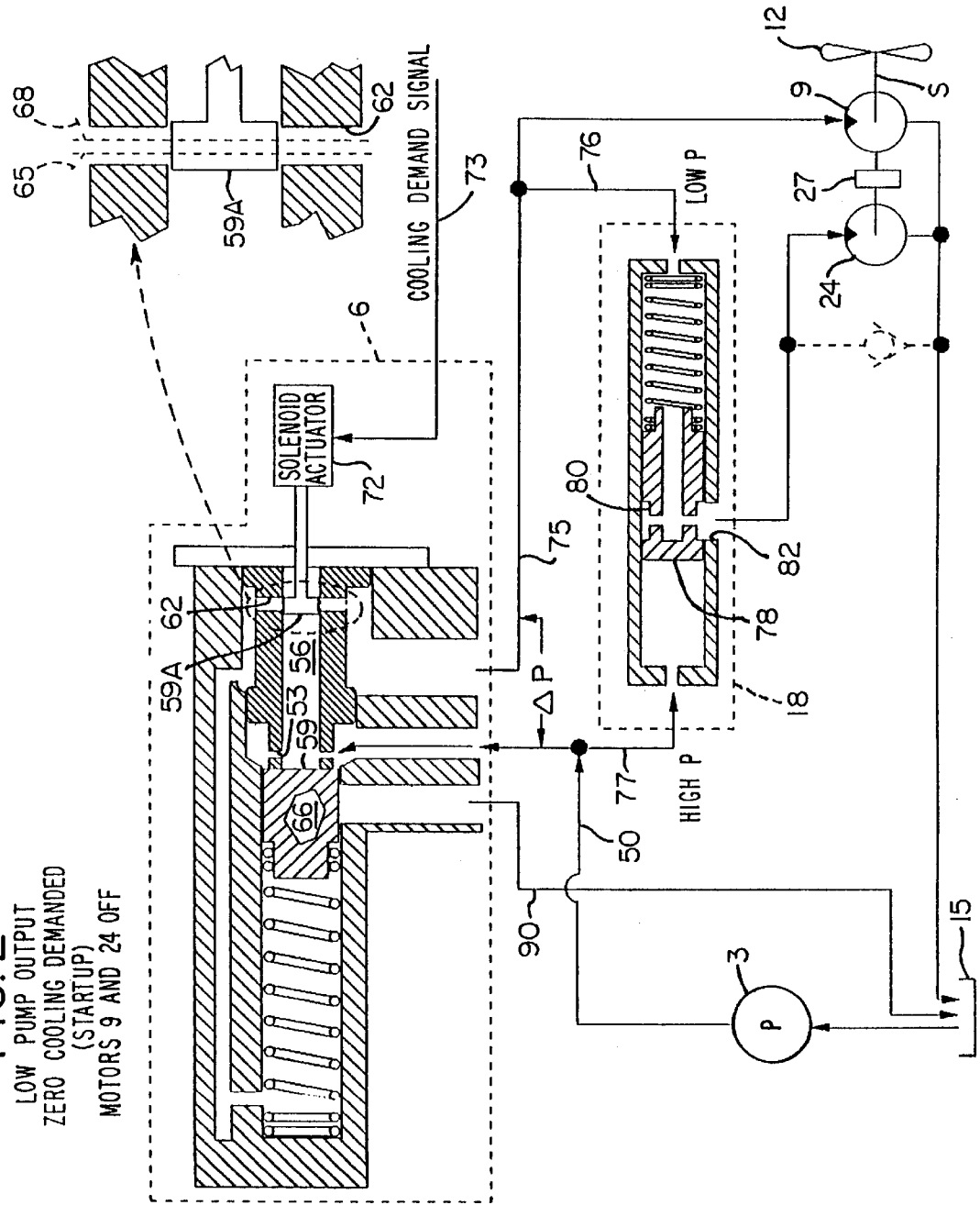

LOW PUMP OUTPUT
ZERO COOLING DEMANDED

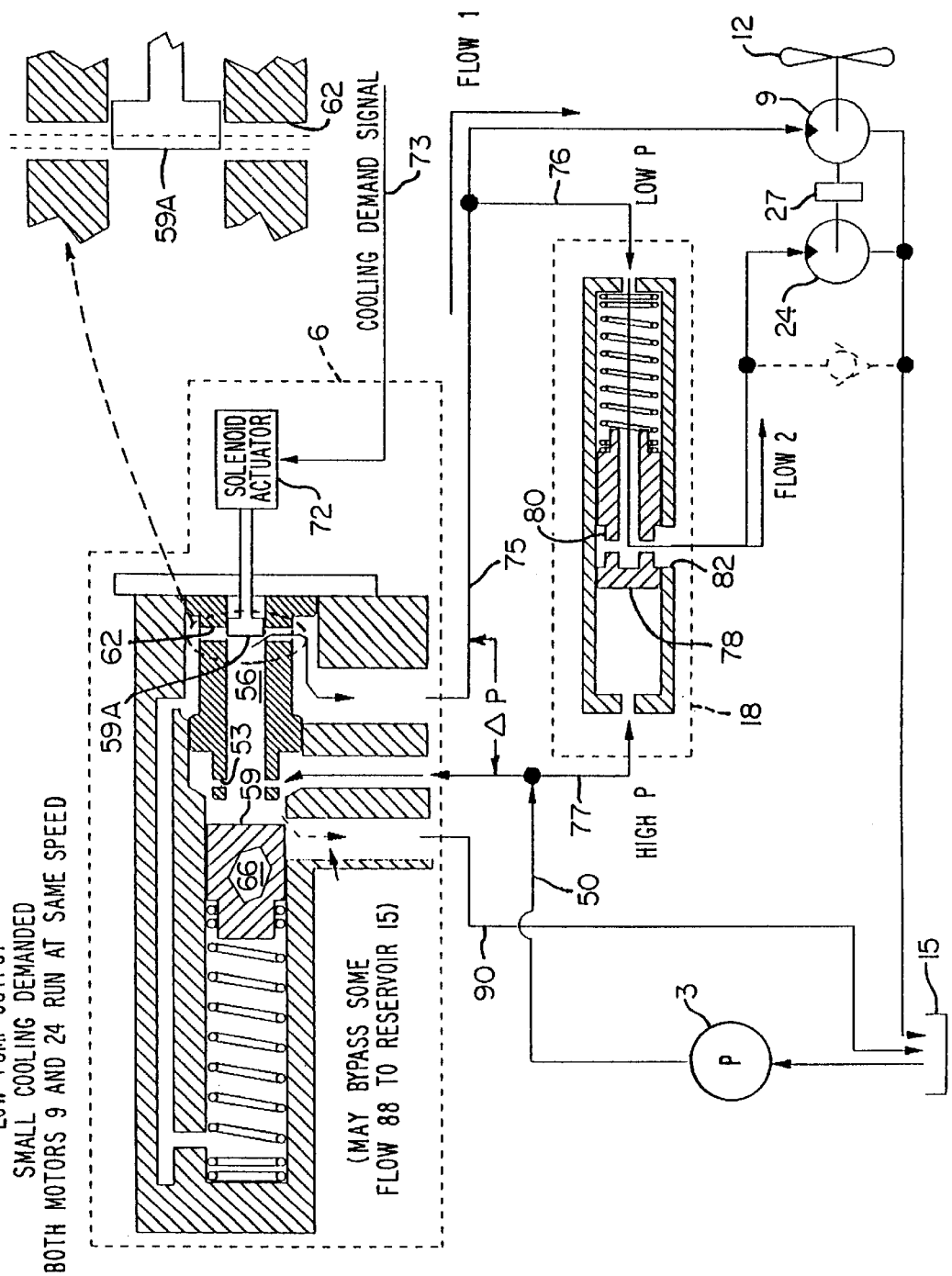

LOW PUMP OUTPUT
MEDIUM COOLING DEMANDED
MOTOR 9 RUNS MOTOR 24 MODULATED

LOW PUMP OUTPUT
LARGE COOLING DEMANDED
MOTOR 9 RUNS, MOTOR 24 OFF

HIGH PUMP OUTPUT
ZERO COOLING DEMANDED

HIGH PUMP OUTPUT
SMALL COOLING DEMANDED
BOTH MOTORS 9 AND 24 RUN

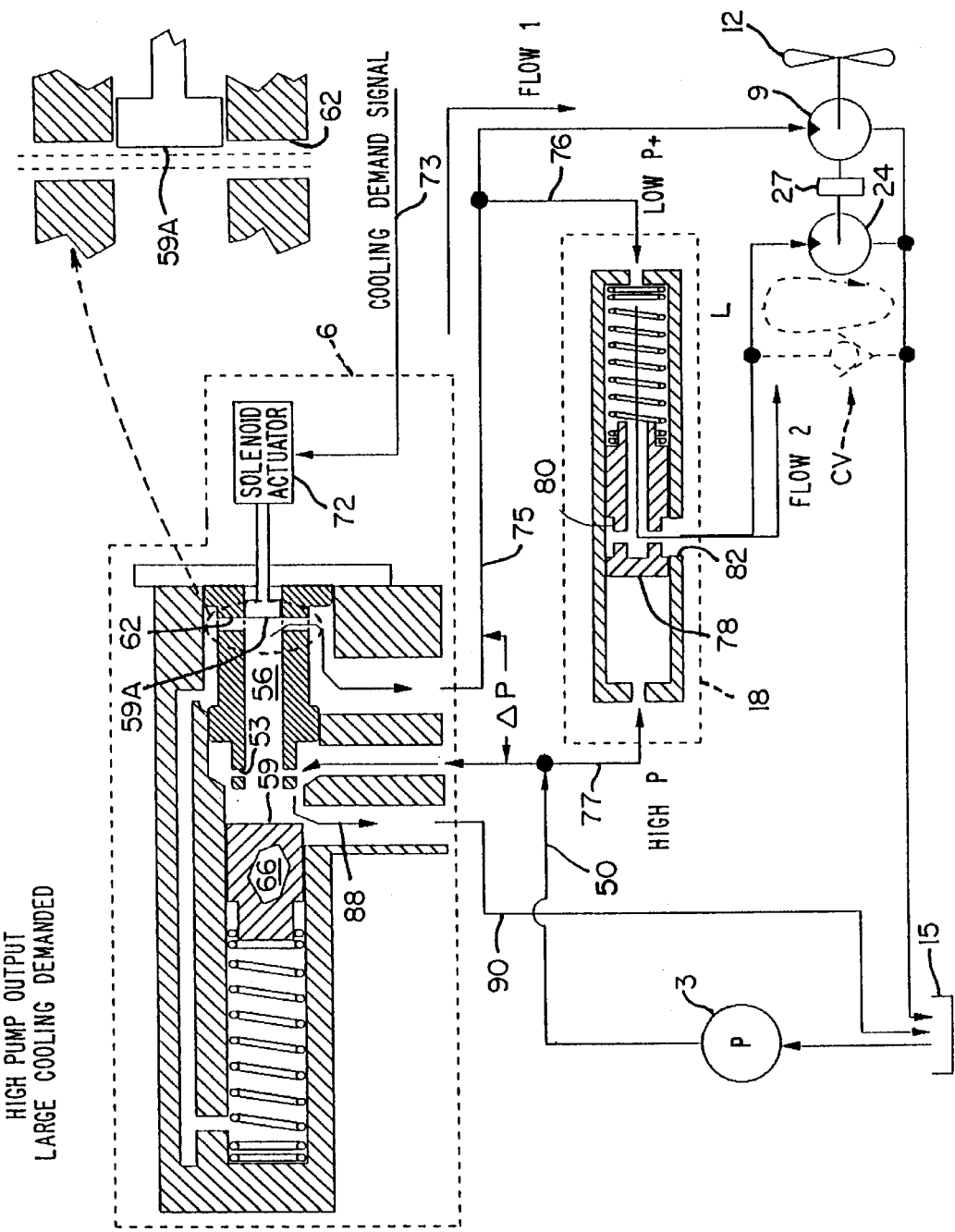

HYDRAULICALLY POWERED FAN SYSTEM FOR VEHICLES

CROSS-REFERENCE TO RELATED APPLICATION

This application is a continuation-in-part of application Ser. No. 08/680,482 filed Jul. 15, 1996, now U.S. Pat. No. 5,669,461; which is a continuation of application Ser. No. 08/400,927 filed Mar. 9, 1995, now issued as U.S. Pat. No. 5,535,845.

FIELD OF THE INVENTION

The invention concerns a control system for a hydraulically powered fan for a radiator in a motor vehicle. The control system selectively powers the fan by one, or two, hydraulic motors.

BACKGROUND OF THE INVENTION

In automotive vehicles, a fan commonly removes heat from liquid coolant, by pumping air through a heat exchanger, or radiator, through which the coolant flows. The fan is commonly driven directly by the engine, through a power-transmission belt.

However, one problem with such direct-drive of the fan is that fan speed is linked to engine speed: as engine speed increases, the fan speed also increases. However, as engine speed increases, vehicle speed also generally increases. But increased vehicle speed increases the ram airflow through the radiator, which also cools the coolant, thereby reducing the need for fan cooling.

Thus, at high engine speed, in many cases, the fan runs at a high speed, but is not needed. Some fans are equipped with clutches, which dis-engage them from the engine, at high engine speeds, to solve this problem.

However, even when this fan problem is solved, other characteristics of fans can be undesirable. One is that fans are noisy. Each fan blade, as it passes an observer, delivers a small pressure pulse to the observer.

As fan speed increases, the number of blade-passes occurring per second also increases, thereby increasing the number of pulses per second. In addition, the magnitude of the pulses also increases as speed increases. Thus, a high-speed fan acts as a loud, high-frequency, noise source.

Another problem which arises is not so much attributable to the fan, as to automotive design principles. In a transversely mounted engine, the crankshaft is perpendicular to the direction of travel. However, the cooling face of the radiator, and the disc representing the fan which cools it, are both preferably perpendicular to the ram air stream, which is parallel to the direction of travel. With this arrangement, the fan's rotational axis is perpendicular to the crankshaft, causing complexity in transferring power from the crankshaft to the fan.

One solution for many of these problems is thought to lie in a hydraulically powered cooling fan. However, in automotive applications, such a fan must be low in cost. The low-cost requirement almost certainly requires that a fixed-displacement hydraulic pump be used, and that it be directly driven by the engine, as opposed to being driven through a transmission. ("Fixed displacement" means that the amount of fluid which is delivered, or displaced, per cycle of the pump is fixed.)

This type of pump, driven in this manner, delivers a large amount of fluid at high engine speeds. However, as explained above, at high engine speeds, in many situations, large fan-cooling is not needed. Thus, the large amount of fluid is not needed. The excess fluid is diverted to a reservoir which supplies the pump.

One problem with this diversion is that, even though the diverted fluid was not used, nevertheless, it was raised to a high pressure by the pump. Raising this diverted fluid to a high pressure requires power. This power must be supplied by the engine, and the diverted fluid, upon which the power was spent, represents an item of waste.

OBJECTS OF THE INVENTION

An object of the invention is to provide an improved cooling system in an automotive vehicle.

Another object of the invention is to provide a cooling system for an automotive vehicle in which hydraulic motors power a cooling fan.

SUMMARY OF THE INVENTION

In one form of the invention, a radiator cooling fan is selectively driven by one or two hydraulic motors, which are energized by the vehicle's engine.

BRIEF DESCRIPTION OF ACCOMPANYING DRAWINGS

FIGS. 1A and 1B illustrate an analogy, which compares power drawn by a single electrical load with power drawn by parallel electrical loads, when all loads are powered by the same current source;

FIG. 1E continues the analogy of FIGS. 1A and 1B;

FIGS. 1C and 1D illustrate an overview of operation of the invention;

FIGS. 2, 3, 4, 5, 6, 7, 8, and 9 illustrate various states which internal components assume during different operating conditions of the invention;

DETAILED DESCRIPTION OF THE INVENTION

Analogy

Because fluid mechanics is a highly technical subject, and because some of the phenomena occurring in hydraulic systems are not readily understandable in a simple, intuitive manner, an analogy is perhaps appropriate. The analogy is taken from electrical engineering.

The analogy is divided into two parts. The first part considers a constant current source which feeds either (a) a single resistor R1 or (b) two resistors R1 and R2 in parallel, and compares power delivered in both cases. The second part illustrates an apparatus which allows selective delivery of power to R1, or to the parallel combination of R1 and R2.

Analogy: First Part

Figure 1B:
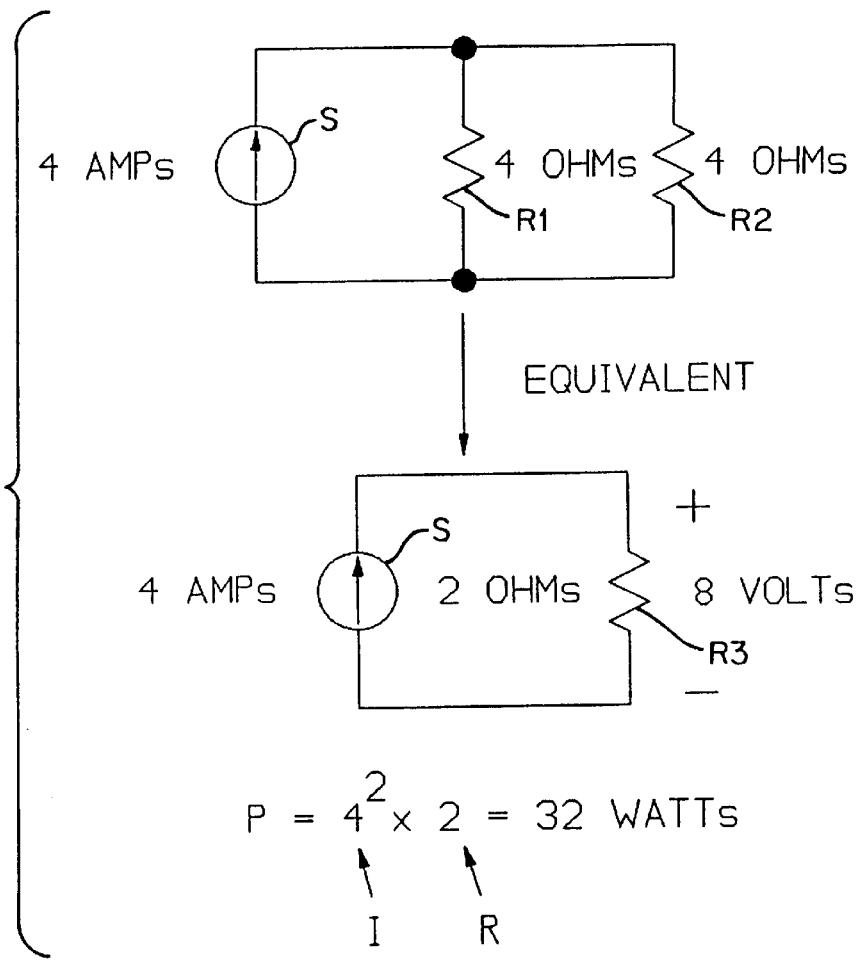
Figure 1A:
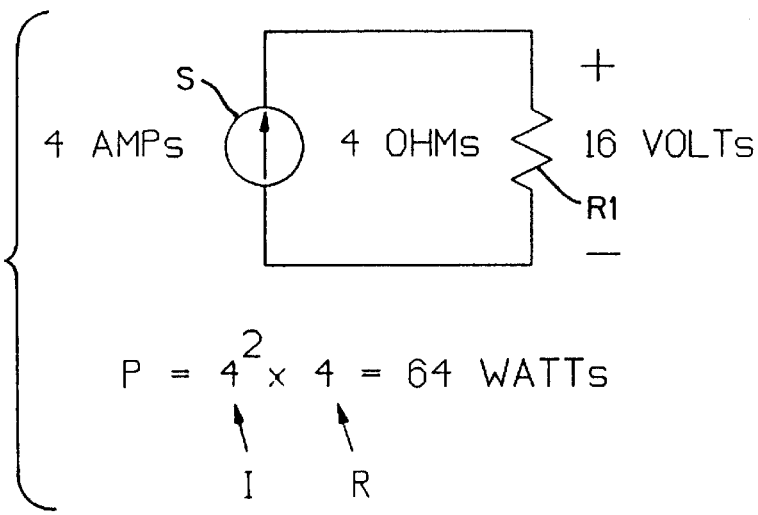

FIG. 1A illustrates a load resistor R1, of value 4 ohms, which is powered by a source S of electrical current. The source S is of the constant-current type, meaning that it delivers a constant current, irrespective of the size of resistor R1. The constant current indicated in FIG. 1A is 4 amps.

The power, P, absorbed by the resistor R1 equals $I^2R$, or (current-squared)×(resistance), which equals 64 watts, as indicated in the Figure. The voltage developed across the resistor R1 equals IR, or (current)×(resistance), and equals 16 volts, as indicated.

This power absorbed must be supplied by the current source S. However, if, as in FIG. 1B, an identical load resistor R2 is added in parallel, then the equivalent resistance seen by the current source S is cut in half, and becomes 2 ohms, as indicated. The power now absorbed is also cut in half, at 32 watts, as indicated.

Therefore, this analogy illustrates the principle that placing a second electrical load in parallel with a first load reduces the total power consumed. The power consumed can be represented by two equivalent expressions:

(1) $P=I^2R$ or (2) $P=IV$, wherein

P represents power,

I represents current, and

V represents voltage.

Regarding expression (1), the added load, R2 in FIG. 1B, reduced the total "R" seen by the current source S. Reducing "R" in the expression $P=I^2R$ reduces "P".

Expression (2) explains the drop in power from another perspective. The reduced total "R" produces a reduced voltage drop, as shown by comparing FIGS. 1A and 1B. The reduced voltage drop is represented by the "V" in expression (2). Reducing this "V" reduces the "P" in expression (2).

In simpler terms: the "R" resists the passage of current, as the name "resistor" implies. Voltage is the agent which drives current through a resistor, as the expression V=IR indicates: Current is proportional to voltage. If "R" is reduced, less voltage is required to pass the same current. With less voltage, less power is required, as indicated by expression (2), P=IV.

The current source S is analogous to a fixed displacement pump. The resistors R1 and R2 are analogous to hydraulic motors, which drive one, or more, fans in a vehicle. When two identical motors are placed in parallel, analogous to resistors R1 and R2 in FIG. 1B, less power is delivered by the pump.

Analogy: Second Part

FIG. 1AA shows the current source S and resistors R1 and R2, discussed previously. Again, R1 and R2 represent hydraulic motors which drive one, or more, cooling fans. However, in FIG. 1AA, the current source S is now a variable current source. It is analogous to a constant-displacement hydraulic pump, which produces a rate of fluid flow which depends on pump speed. If a vehicle engine drives the pump, then this rate of flow depends on the engine speed, although rate of flow is constant at a given engine speed.

In addition, a control C has been added. Control C controls a "current valve" V, which can be viewed as an idealized transistor, and which controls the amount of current reaching resistor R2. Control C also controls a variable bypass resistor RB, which, in effect, controls the equivalent parallel resistance of R1 and RB, thereby controlling the voltage across R1. The control C allows the power delivered by the source S to be reduced, compared with the situation where source S feeds resistor R1 alone.

To illustrate one advantage of this arrangement, consider the efficiency of power transfer, from source S to the loads R, as the demand for power at loads R1 and R2 is varied from maximum to minimum. (This variance in demand occurs in a vehicle, as when demand for cooling, which is supplied by the motors represented by resistors R1 and R2, varies from a maximum to a minimum.) Maximum power is delivered when RB is fully open-circuited and valve V is non-conducting. At this time, all current from supply S is forced through resistor R1, and power transmission is 100 percent: all power delivered by the source S is absorbed by resistor R1.

As power demanded by loads R1 and R2 is reduced, current flow through valve V is initiated and progressively increased, until valve V becomes completely conducting. At that time, the voltage across the parallel pair of R1 and R2 becomes determined by the current supplied by source S, as explained above. The power transmission is again 100 percent, assuming no losses in valve V.

As power demanded diminishes further, RB becomes conductive, allowing current to flow through RB in parallel with R1 and R2. As the resistance RB is lowered, the power delivered to loads R1 and R2 decreases, while RB dissipates some power.

Therefore, power transmission of 100 percent occurs at two operating points, namely, when R1 acts as the sole load, and when R1 in parallel with R2 acts as the load. In contrast, if R2 were not available to place in parallel with R1 (that is, R2 and valve V are not in existence in this case), then 100 percent power transmission would occur only at a single operating point, namely, when RB has infinite resistance, and R1 acts as the sole load.

One Overview of Invention

Figure 1D:
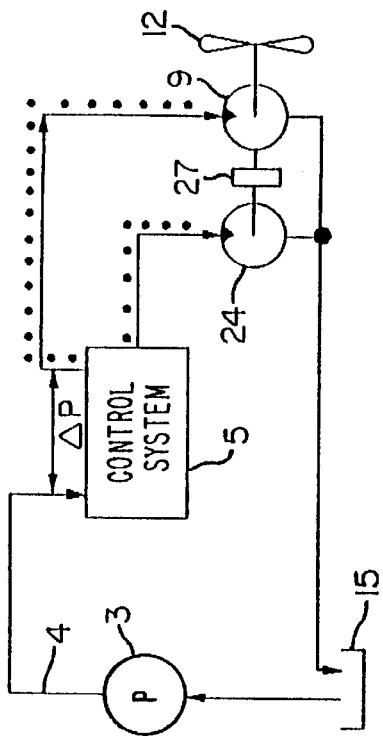
Figure 1C:
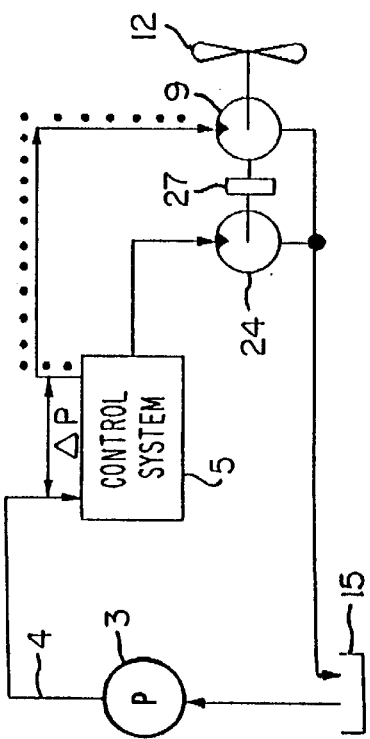
Figure 1E:
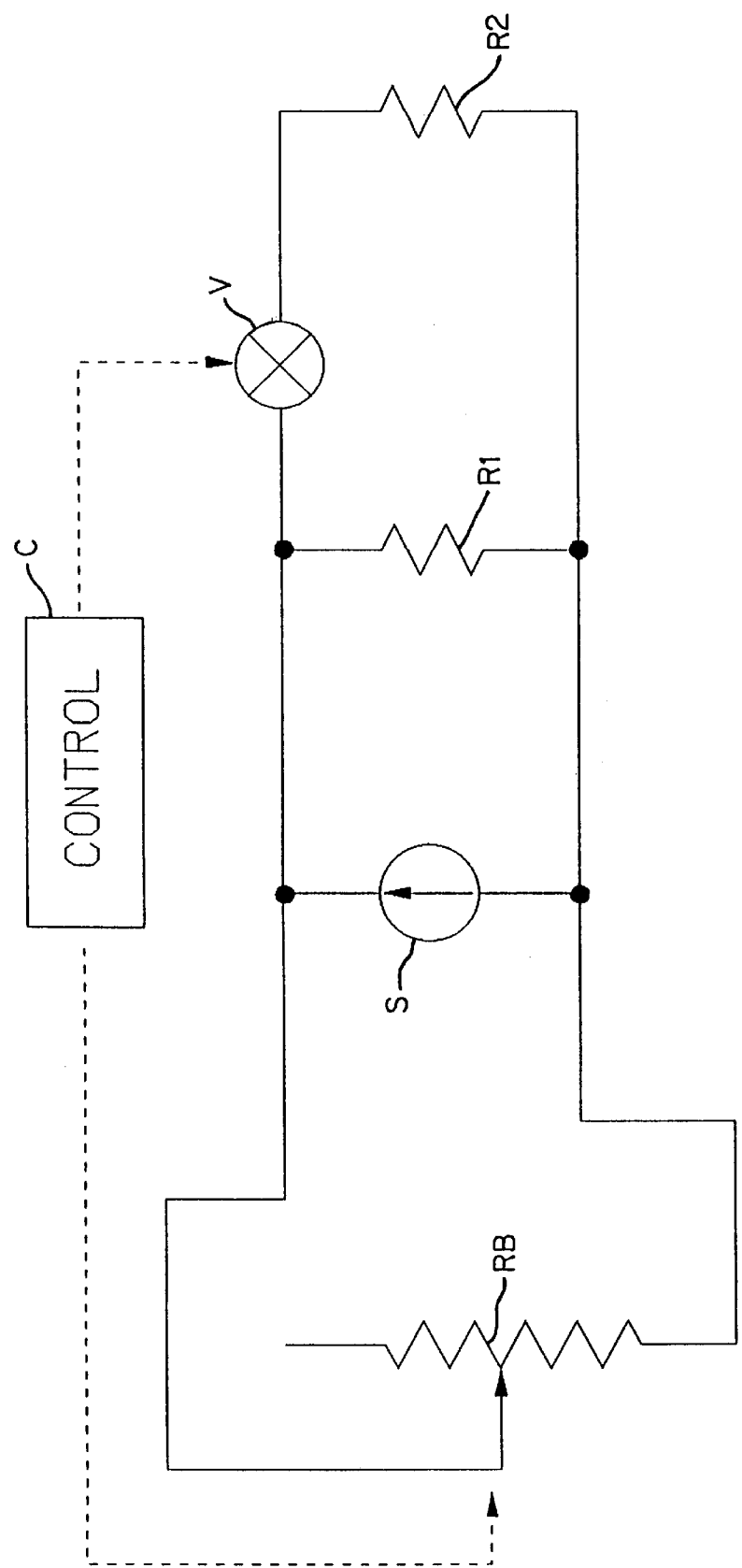

In FIG. 1C, under one set of operating conditions, a control system 5 accepts fluid from a hydraulic pump 3, driven by a vehicle engine (not shown). The control system 5 delivers fluid flow, indicated by the string of dots, to a hydraulic motor 9, which drives a radiator cooling fan 12. No flow is delivered to hydraulic motor 24 at this time.

In FIG. 1D, under another set of operating conditions, the control system 5 delivers flow to both motors 9 and 24, which together drive fan 12.

In hydraulics generally, power delivered is proportional to (flow rate)×(pressure drop). This expression is analogous to the electrical expression (2), given above, which is (current)×(voltage). That is, electrical current is analogous to hydraulic flow rate, and voltage is analogous to pressure drop.

In FIG. 1D, at a given flow rate of pump 3, the pressure developed across the pair of motors will be less than the pressure developed across the single motor of FIG. 1C. A simple way of understanding this is that, in FIG, 1D, the pair of motors, in parallel, represent a lower total resistance to flow, similar to the parallel resistors of FIG. 1B.

Since the constant displacement pump 3 faces a lower resistance in FIG. 1D, a lower pressure is developed, compared with FIG. 1C. The quantity (flow rate)×(pressure drop) has become reduced, and the hydraulic motor draws less power from the engine (not shown).

Therefore, to summarize: two identical hydraulic motors in parallel, powered by a constant source of hydraulic fluid, will draw less power than one of the motors.

In actual practice, in both FIGS. 1C and 1D, the pump 3 may produce excess flow, because of being driven by a high-speed engine. The control system 5 (a) causes this excess to bypass the motors 9 and 24, through a flowpath which is not shown, and (b) discards this excess to a reservoir 15.

DETAILED DESCRIPTION

FIGS. 2–9 provide greater detail of the invention, and illustrate several operating modes of one form of the invention.

FIG. 2: Low Pump Output, Zero Cooling Demanded (Startup)

FIG. 2 illustrates a likely situation occurring momentarily when the vehicle utilizing the invention executes a start-up. Pump 3 delivers flow to line 50, and the flow enters cavity 56 within valve 6, through holes 53. At this time, zero cooling is demanded, as indicated by the closed position of piston 59A, blocking holes 62.

An enlargement of piston 59A is given at the upper right part of the Figure, for clarity. Dashed lines 65 and 68 have been added, for comparison of the relative positions of piston 59A shown in different Figures. The position of piston 59A is controlled by a solenoid actuator 72, which, in turn, is controlled by an electrical cooling demand signal, on line 73.

Valve 6 is commercially available. It is used in speed-sensitive power steering systems. In such systems, a signal similar to the signal labeled "COOLING DEMAND SIGNAL" is used, but that signal does not represent a cooling demand signal. Instead, that signal represents speed of the vehicle.

In a somewhat different type of valve, piston 59A is, in effect, welded in a fixed position, with respect to holes 62, thereby defining, together with holes 62, a fixed aperture. Solenoid actuator 72 is eliminated. This type of valve is found in ordinary power steering systems, as opposed to speed-sensitive systems.

In both types of valve, the flow exiting on line 75 is controlled, independent of output of pump 3. In the valve which uses the solenoid actuator 72, that flow is determined by the signal on line 73. In the valve lacking the solenoid actuator 72, that flow is determined by the size of aperture 62 left uncovered by piston 59A. But, again, in either case, the valve 6 acts as a source of a constant flow rate of hydraulic fluid, although, in the valve equipped with movable piston 59A, that flow rate is, of course, adjustable.

Returning to FIG. 2, since piston 59A in valve 6 blocks holes 62, no flow reaches line 75. Thus, a relatively low pressure exists in line 76, as indicated, compared with the relatively high pressure existing in line 50, also indicated. Consequently, pintle 78 in valve 18 is driven to the position shown, wherein annulus 80 mates with aperture 82.

Figure 2A:
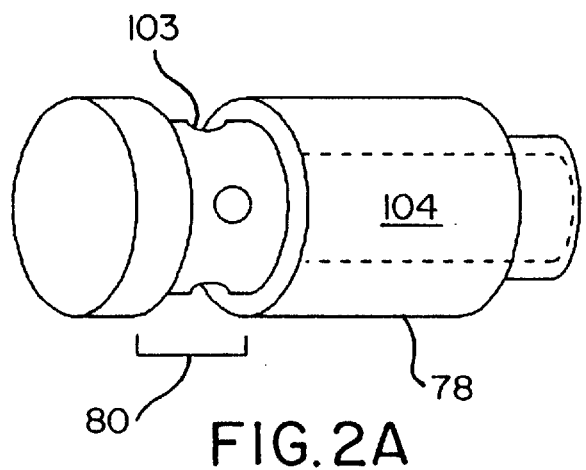
FIG. 2A illustrates pintle 78 in greater detail.

FIG. 2A provides a more detailed view of the construction of pintle 78. Annulus 80 communicates with an internal bore 104 through holes 103, allowing pressurized fluid within bore 104 to reach aperture 82 in FIG. 2, if the pintle 78 is properly positioned.

However, in FIG. 2, since no flow runs through line 75 at this time, because of the position of piston 59A, no flow enters valve 18 through line 76, and no flow exits aperture 82. Motor 24 receives no fluid, and does not run. Also, motor 9 receives no fluid, because no flow runs through line 75.

Therefore, in the instantaneous start-up situation of FIG. 2, both motors 9 and 24 are off, and pintle 78 assumes the position shown.

Figure 3:
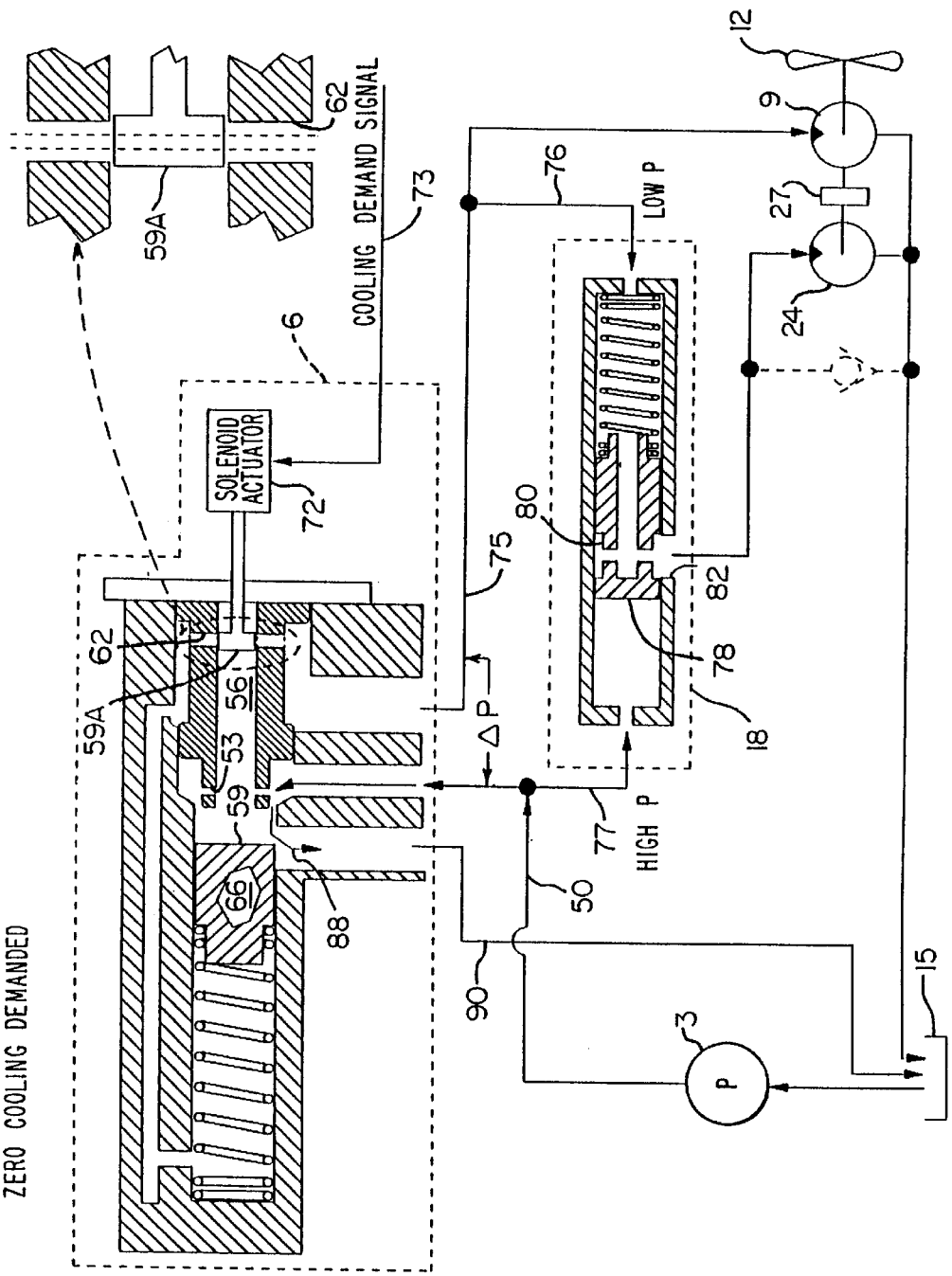

FIG. 3: Low Pump Output, Zero Cooling Demanded (After Startup)

Shortly after the situation in FIG. 2 occurs, pressure builds up in cavity 56 in valve 6, applying a leftward force to face 59. This force pushes pintle 66 to the left, allowing flow 88 to enter line 90, and reach reservoir 15. A fluid pressure in the range of 25 psi within cavity 56 is sufficient to accomplish this movement of pintle 66. This 25 psi pressure will be termed the "cracking pressure," since it "cracks" pintle 66 open, creating flow 88. However, since piston 59A still blocks holes 62, because of the demand for zero Age cooling, both motors 9 and 24 remains off, for the reasons given in connection with FIG. 2.

FIG. 4: Low Pump Output, Small Cooling Demanded

In FIG. 4, a small amount of cooling is demanded, as indicated by the partially open position of piston 59A, but output of pump 3 is still small, perhaps because the engine of the vehicle is running at, or near, idle speed. Under these conditions, much of the flow 88, which was diverted to reservoir 15 in FIG. 3, now flows through holes 62, which are partially uncovered by piston 59A.

Flow 88 may be fully reduced to zero, or some flow 88 may exist, and be diverted to the reservoir 15, as indicated in FIG. 4. The amount diverted depends upon the position of piston 59A and the flow rate of pump 3.

That is, valve 18 is constructed so that pintle 78 in valve 18 never moves far enough to the right to allow flow in line 50 to exit through apertures 82 in valve 18. Thus, all flow from pump 3 either goes through holes 62 or is diverted as flow 88 in FIG. 3. None flows through line 77 (except to move pintle 78, which is an insignificant, temporary flow). Restated: the sum of (1) flow through holes 62 plus (2) flow 88 equals output of pump 3.

In FIG. 4, the flow exiting holes 62 reaches line 75, and then motor 9, actuating that motor. In addition, the pressure in line 76 is still relatively low, for reasons explained immediately below. The pressure drop, DELTA-P, from line 50 to line 75 is the same as in FIG. 3, at approximately 25 psi. ("DELTA" refers to the Delta-character of the Greek, which appears in the Figures.) This pressure drop causes pintle 78 in valve 18 to remain in nearly the same position as in FIG. 3. This position allows FLOW2 to reach motor 24. (In contrast, in FIG. 3, FLOW2 did not exist, despite the fact that pintle 78 is in similar positions in both FIG. 3 and 4. The reason is that, in FIG. 3, piston 59A blocked flow in line 75, which supplies FLOW2.)

Figure 4A:
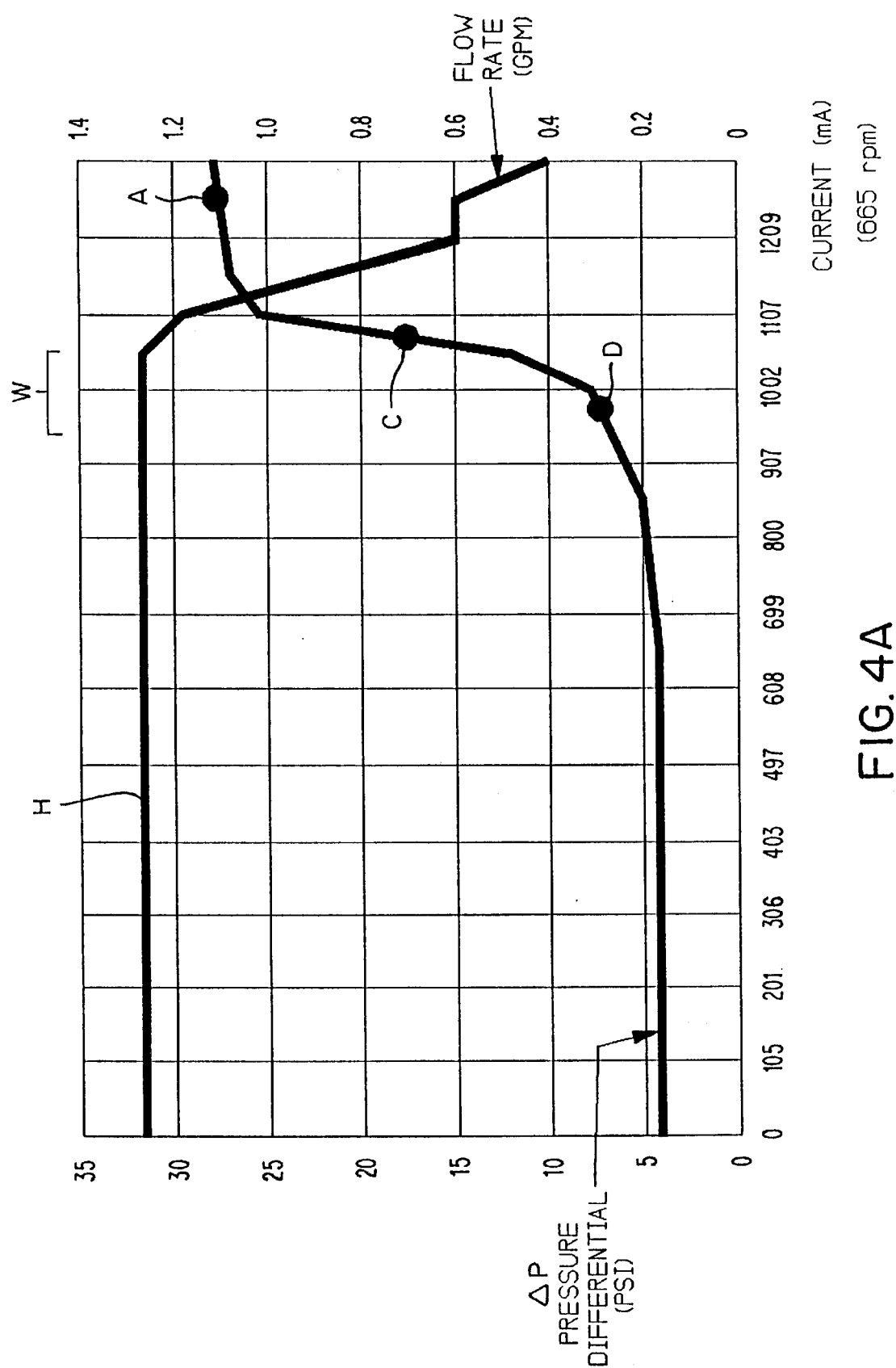
FIG. 4A is a plot of pressure and flow rate of valve 6 in FIG. 2, at a relatively low pump speed.

To explain the present low pressure in line 76, FIG. 4A plots two quantities against electrical current on line 73, which represents the cooling demand signal. These quantities are (1) the pressure differential, DELTA-P shown in FIG. 4 between lines 50 and 75, and (2) the flow through line 75. In the present situation, the operating point in FIG. 4 is approximately at point A. Flow in line 75 is relatively low, at about 0.5 gpm (gallons per minute). The pressure drop, DELTA-P, is about 28 psi, which is relatively high, creating a relatively low pressure in line 76, compared with that in line 77.

Two features of FIG. 4A are significant. Both relate to control of flow through holes 62 by the signal on line 73. One feature is that, in FIG. 4, an operating point of valve 6 exists, approximately within window W in FIG. 4A, which has specific characteristics. At this operating point, piston 59A in valve 3 in FIG. 4 uncovers holes 62 sufficiently so that the cracking pressure in chamber 56 is not maintained.

When cracking pressure is not maintained, flow 88 in FIG. 4 terminates, and flow rate through holes 62 reaches its peak, as the horizontal section H of the plot labeled FLOW RATE (GPM) in FIG. 4A indicates. At this maximum flow rate through holes 62, the cooling demand signal on line 73 in FIG. 4 is ineffective to further increase flow through holes 62.

The second feature is related to the situation when piston 59A covers some part of holes 62, so that the cooling demand signal on line 73 is effective to both increase, and decrease, flow. The region approximately to the right of window W in FIG. 4A represents this situation. In this region, cracking pressure has been met, or exceeded.

In this situation, the flow rate in FIG. 4A is somewhat inversely proportional to the magnitude of the cooling demand signal. That is, as the cooling demand signal increases, flow decreases.

This inverse relationship provides a fail-safe feature. The system of solenoid 72/piston 59A normally holds holes 62 open. The cooling demand signal is used to close the holes 62. If the cooling demand signal becomes faulty, perhaps because wire 73 breaks, flow will still reach line 75, and actuate motor 9. The system can operate safely, despite the fault.

Returning to the mode shown in FIG. 4: FIG. 4A shows "Pressure Differential," which corresponds to the DELTA-P shown in FIG. 4. Pressure in line 50, minus DELTA-P (also shown in FIG. 4A), approximately equals that in line 76. The larger DELTA-P becomes, the greater becomes the difference in pressures between lines 76 and 50. With sufficiently large pressure difference, pintle 78 moves to the right, and connects line 76 with aperture 82.

In FIG. 4, a large pressure difference exists, and annulus 80 of pintle 78 mates with aperture 82, allowing fluid in line 76 to exit valve 18 as FLOW2. FLOW2 actuates motor 24. Motor 24 is connected to fan 12 through an overrunning clutch 27: both motors 9 and 24 power the fan 12.

Thus, at this time, when pump output is low, and small cooling is demanded, both motors 9 and 24 are running, preferably at the same speed.

Figure 5:
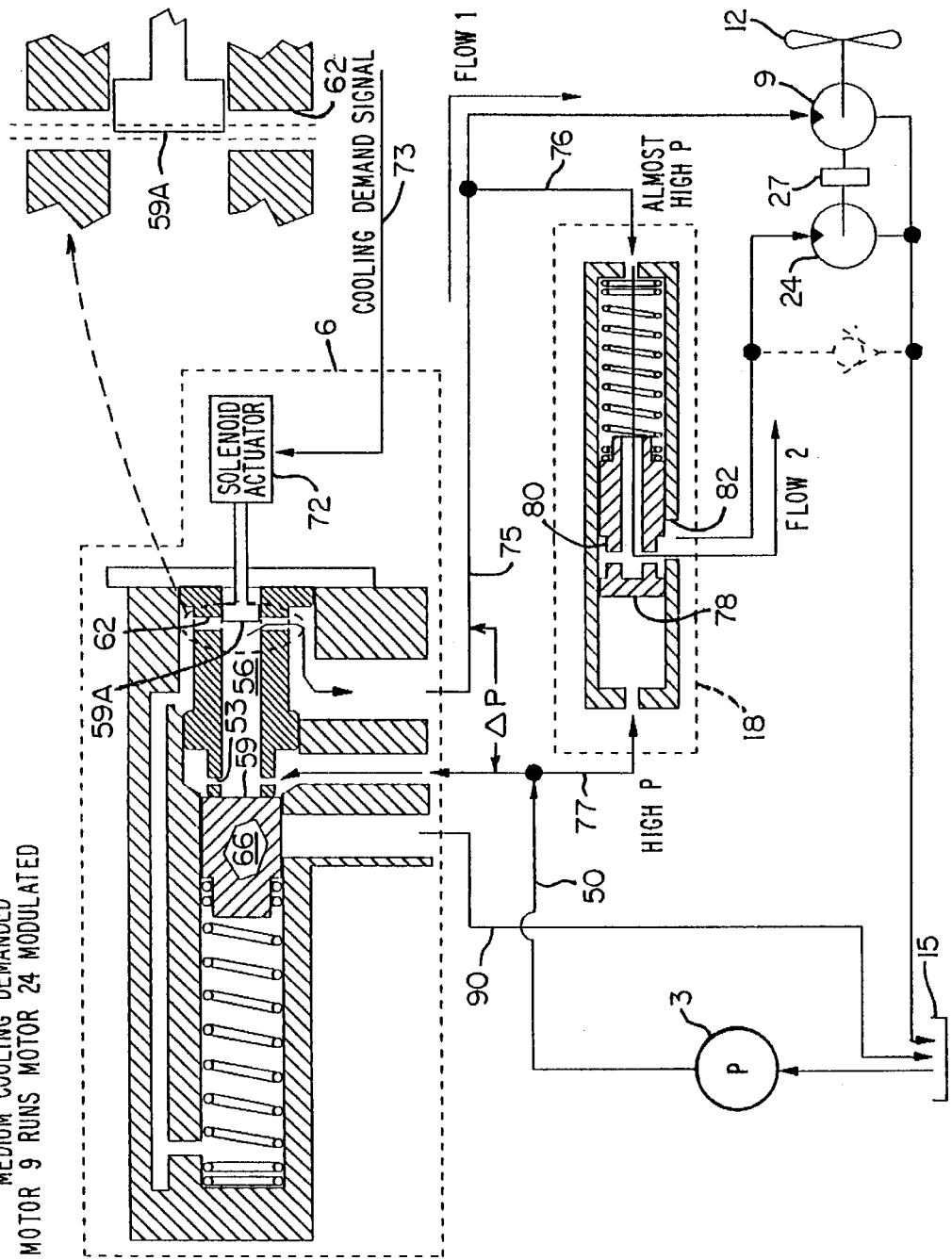

FIG. 5: Low Pump Output, Medium Cooling Demanded

In FIG. 5, pump output is the same as in FIGS. 2–4, but a medium amount of cooling is demanded, as indicated by the larger amount of holes 62 uncovered by piston 59A, as compared with FIG. 4. The operating point can be taken as point C in FIG. 4A. There, flow rate in line 75 is greater than for point A, which represents FIG. 4, but pressure differential (ie, DELTA-P in FIG. 5) is less, indicating that the pressures in lines 76 and 77 are closer to each other than in FIG. 4.

These closer pressures are indicated as "HIGH" and "ALMOST HIGH" in FIG. 5. Consequently, pintle 78 in valve 18 will assume an intermediate position between fully open, as in FIG. 4, and fully closed, as in FIG. 6, discussed later. The particular intermediate position assumed controls the flow rate of FLOW2, and thus modulates the speed of motor 24.

Therefore, in FIG. 5, the cooling demand signal on line 73 controls the position of piston 59A. The position of piston 59A determines the position of pintle 78, which determines the flow rate of FLOW2. This flow rate controls the speed of motor 24.

A comparison of FIGS. 4 and 5 illustrate a significant feature of the invention. In FIG. 4, demand for cooling was small. Both motors 9 and 24 run. In FIG. 5, demand for cooling is greater. Now, the speed of motor 24 is modulated, and motor 9 runs at the speed determined by FLOW1.

Cracking pressure may, or may not, have been exceeded.

Figure 6:
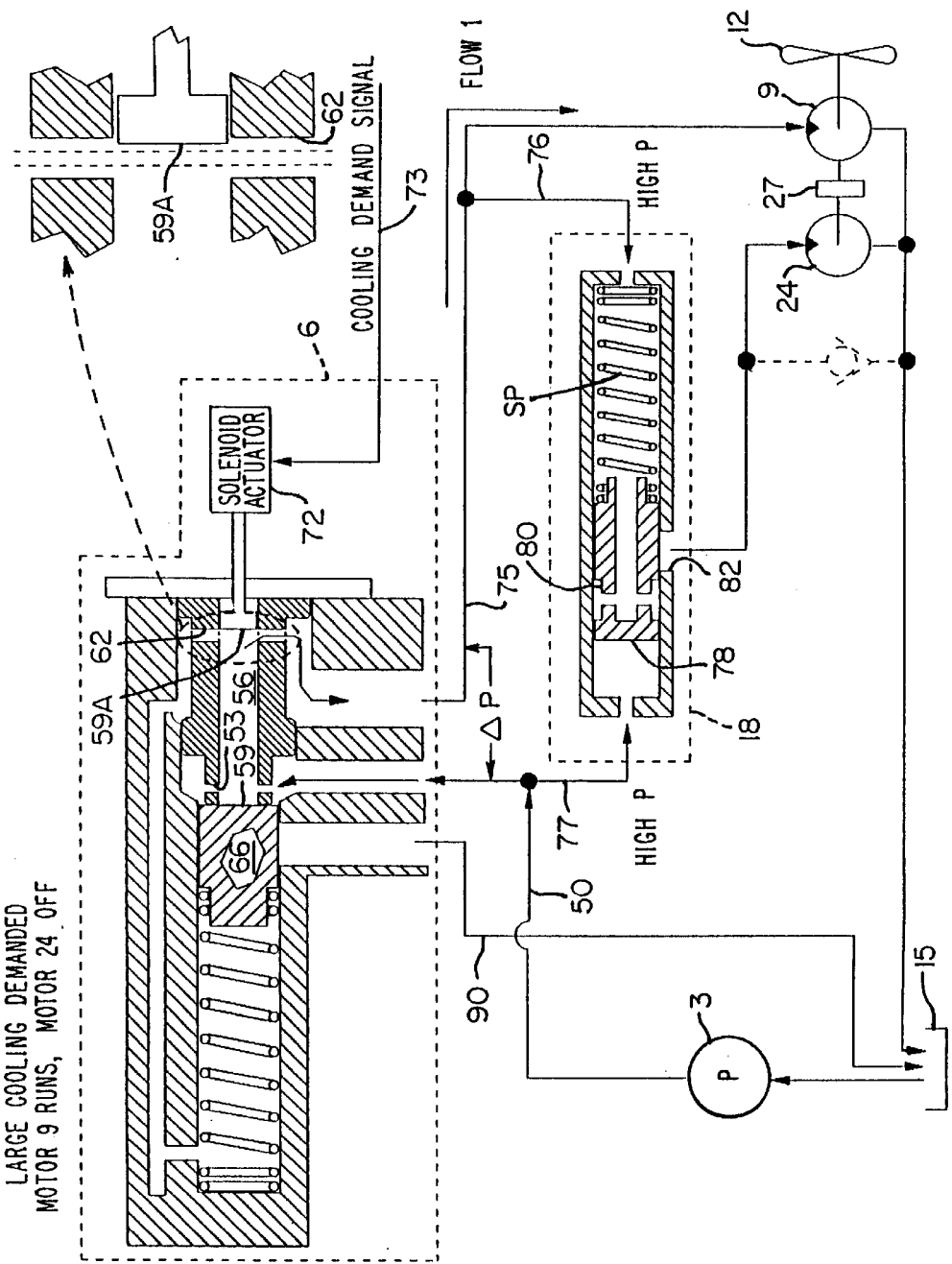

FIG. 6: Low Pump Output, Large Cooling Demanded

In FIG. 6, piston 59A opens holes 62 to the extent that DELTA-P is very low. The operating point is represented by point D in FIG. 4A, or a point to the left of D.

DELTA-P is small. (A simplified explanation for this small DELTA-P is that a small flow through a large hole 62 causes a small pressure drop.) The small DELTA-P causes the pressures in lines 76 and 77 to both be nearly equal, causing pintle 78 in valve 18 to move to the left, under the influence of spring SP. Flow to motor 24 is blocked.

Cracking pressure has not been exceeded.

A comparison of FIGS. 4 through 6 illustrate an important sequence of operation of the invention. In those Figures, the sequence of cooling demand is, speaking very generally:

(1) "small," as in FIG. 4;

(2) "medium," as in FIG. 5; and then (3) "high," as in FIG. 6.

With small cooling demand, both motors 9 and 24 operate. With medium cooling demand, both motors 9 and 24 operate, with motor 24 being modulated by valve 18. With high cooling demand, motor 9 operates exclusively. The medium cooling demand situation represents the transition from dual-motor operation to single-motor operation.

Figure 7:
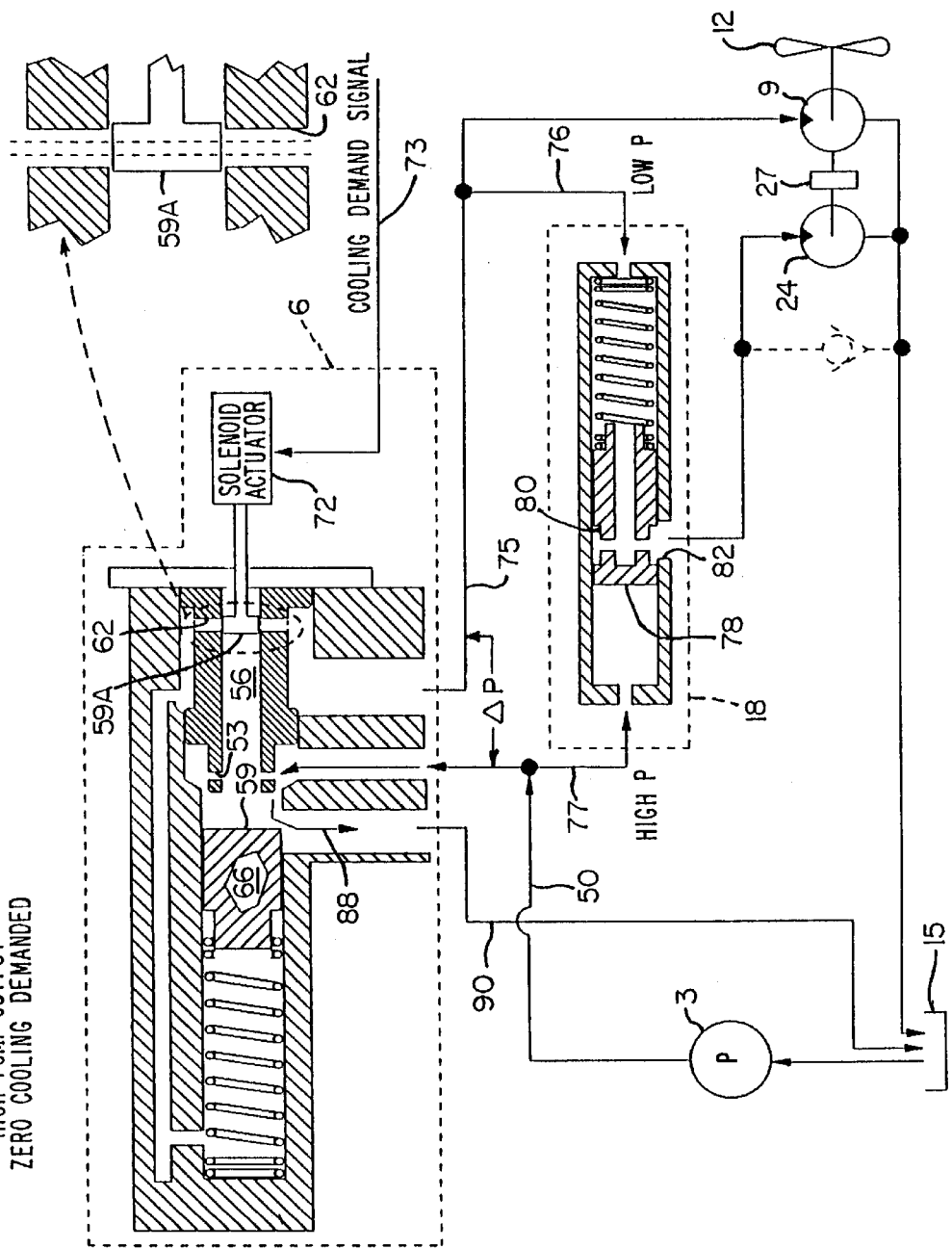

FIG. 7: High Pump Output, Zero Cooling Demanded

In FIG. 7, piston 59A blocks holes 62. No flow reaches line 75. All incoming flow on line 50 is diverted to line 90, and thence to the reservoir 15. Motors 9 and 24 are off.

Figure 8:
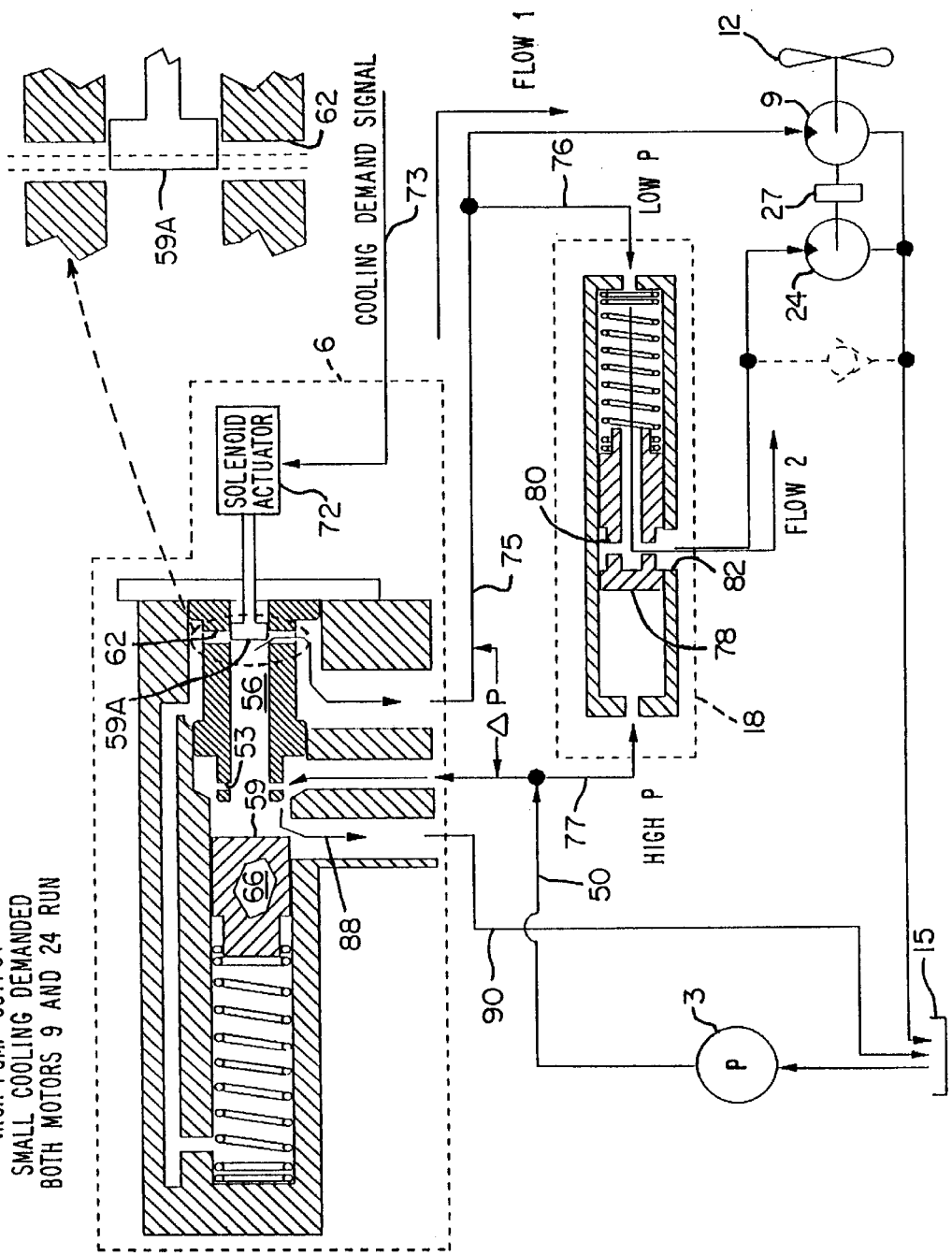

FIGS. 8 and 9: High Pump Output, Small and Large Cooling Demanded

In FIG. 8, representing high pump output and small cooling demanded, piston 59A partially opens holes 62. High pump output occurs, for example, at pump speeds of 2,000 rpm and higher.

Figure 4B:
FIG. 4B is a plot of pressure and flow rate of valve 6 in FIG. 2, at a relatively high pump speed.

DELTA-P is high. A simplified explanation of the high DELTA-P is that, in general, a large flow now occurs through holes 62, which causes a larger pressure drop than the smaller flow, as occurs in FIG. 4, for example. The plot of FIG. 4B is now applicable, and the operating point can be taken as point E.

With the high DELTA-P, valve 18 opens fully, or almost fully, because of the high pressure in line 77, compared with the low pressure in line 76. Both motors now run: FLOW2 comes into being, and drives motor 24. FLOW1 drives motor 9. Both motors preferably run at the same speed. There is no modulation of motor 24.

In FIG. 9, representing high pump output and high cooling demand, piston 59A opens holes 62 completely, or nearly so. Since the output of pump 3 is high, DELTA-P is only slightly lower than in FIG. 8. The operating point can be taken as point F in FIG. 4B.

In FIG. 9, this slightly lower DELTA-P is indicated by the go "+" sign added to the symbol "LOW P" associated with line 76. The "+" sign means that the pressure in line 76 is slightly greater than in FIG. 8.

In FIG. 9, pintle 78 is in nearly the same position as in FIG. 8. Both motors 9 and 24 run, preferably at the same speed, and motor 24 is not modulated.

In both FIGS. 8 and 9, the output of pump 3 is sufficiently large that cracking pressure is always exceeded, no matter how widely piston 59A opens holes 62.

The Inventor points out that, in a differently designed system, apertures 62 may be sufficiently large that, as piston 59A opens, but prior to full opening of piston 59A, the cracking pressure may fail to be sustained, even at high output of pump 3. In this case, point G in FIG. 4B would be reached, and fan speed will increase because of restriction of flow being delivered to motor 9, in a progression similar to that of FIGS. 4, 5, and 6. Thus, the energy-saving function of the circuit can be employed at varying pump output levels until a maximum flow is attained which produces the cracking pressure, despite a fully opened valve 6, as in FIG. 9.

One Recapitulation

One recapitulation of the events occurring in FIGS. 3–8 is given by the following Table:

TABLE

| FIGURE | Pump 3 Output | Cooling Demand | Flow 88 | Motor 9 | Motor 24 |
|---|---|---|---|---|---|
| 3 | Low | Zero | Yes | OFF | OFF |
| 4 | Low | Small | Possible | ON | ON |
| 5 | Low | Medium | Possible | ON | Modulated |
| 6 | Low | Large | No | ON | OFF |
| 7 | High | Zero | Yes | OFF | OFF |
| 8 | High | Small | Yes | ON | ON |
| 9 | High | Large | Yes | ON | ON |

Additional Considerations

1. As explained above, valve 6 holds flow in line 75 to a constant value. At whatever value the flow rate stands, when both motors 9 and 24 are actuated, the pressure in line 75 will be less than if motor 9 were running alone. With this lesser pressure, valve 6 is required to deliver less power to the motors 9 and 24. Since valve 6 receives its power from pump 3, pump 3 is required to deliver less power.

2. An important feature is the reduction in wasted energy attributable to flow 88 in FIG. 8, for example. As explained above, when both motors 9 and 24 in FIG. 8 are running, the pressure in line 75 is less than if motor 9 is running alone. When pressure in line 75 is less, the pressure in line 50 is also less. (Pressure in line 50 equals pressure in line 75 plus DELTA-P.)

Since the diverted flow 88 originated in line 50, a lower pressure in that line means that the wasted power represented by flow 88 is lower. Restated, the fluid contained within flow 88 necessarily must have been raised to the pressure in line 50, because line 50 is the output of pump 3, and that fluid originated in pump 3. But flow 88 is dropped to zero pressure, when it reaches reservoir 15. The amount of power wasted is proportional to (rate of flow 88)×(pressure in line 50—pressure in reservoir 15). Thus, if pressure in line 50 is reduced, the wasted power is also reduced.

3. A single control line 73 controls multiple components. That is, under conditions when flow in line 90 does not exist, line 73 controls (1) the speed of motor 9, (2) whether motor 24 runs and, if so, (3) the speed of motor 24.

4. Motor 24 only contributes power to fan 12 when the speed of motor 24 reaches that of motor 9. When motor 24 runs slower than motor 9, overrunning clutch 27 slips. Thus, under operating conditions when annulus 80 in valve 18 barely mates with aperture 82, so that FLOW2 is very small, the speed of motor 24 will be low, and overrunning clutch 27 will slip.

5. The function of overrunning clutch 27 can be replaced by a check valve CV in FIG. 9. In this case, both motors 9 and 24 are locked to a common shaft S, which drives fan 12. Overrunning clutch 27 is absent.

When motor 24 is not powered by valve 18, it acts as a pump, and is driven by motor 9. The fluid pumped by motor 24 flows through check valve CV, and recirculates through loop L.

Figure 10:
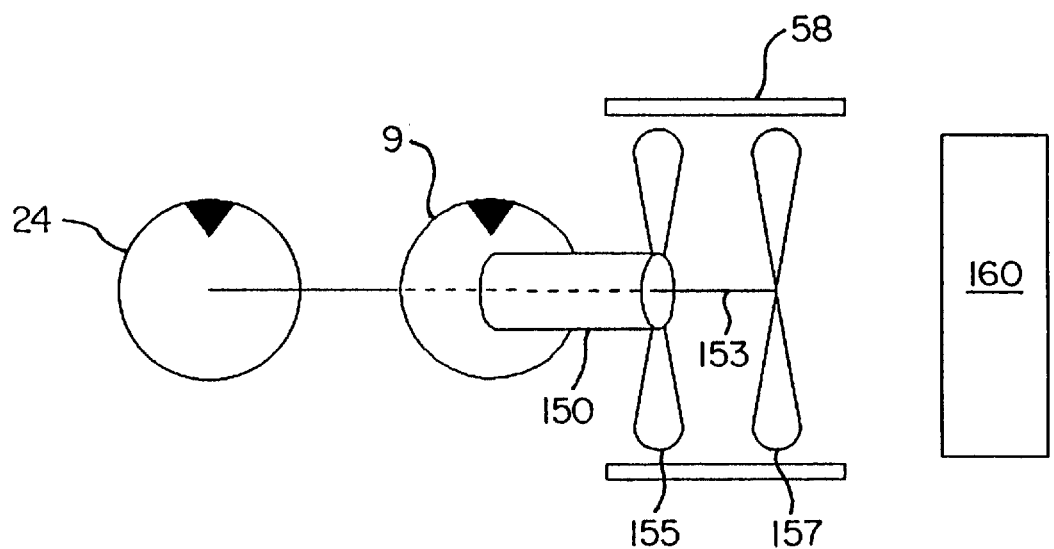
FIG. 10 illustrates another embodiment of the invention.

6. Motors 9 and 24 need not power a single fan 12. They may power two separate fans, or coaxial shafts 150 and 153 in FIG. 10, which power two fans 155 and 157, which are housed in a common duct 58, which feeds air to radiator 160.

Numerous substitutions and modifications can be undertaken without departing from the true spirit and scope of the invention. What is desired to be secured by Letters Patent is the invention as defined in the following claims.

What is claimed is:

1. A control system for first and second hydraulic devices in a vehicle which contains a hydraulic pump, comprising:
    a) a first valve for receiving fluid from the pump and delivering flow at a rate controlled by an independent control signal related to the combination of loads across said first and second hydraulic devices; and
    b) a second valve hydraulically coupled to said first valve responsive to a pressure across said first valve for allocating said flow for restricting flow to one of said devices, based on predetermined operating conditions of the first valve.

2. A control system for first and second hydraulic devices in a vehicle which contains a hydraulic pump, comprising:
    a) a first valve for receiving fluid from the pump, and delivering flow at a rate controlled by a control signal; and
    b) a second valve for allocating said flow between said devices, based on predetermined operating conditions of the first valve;
    the second valve comprises
        i) a first port which senses input pressure of the first device;
        ii) a second port which senses pressure at an output of the pump; and
        iii) a pintle which diverts flow from the first device, to the second device, when pressures in the first and second ports reach a predetermined difference.

3. In an apparatus for use in a hydraulically driven cooling system which is powered by a hydraulic pump in a vehicle, the improvement comprising:
    a) means for reducing output pressure of the pump when the pump is delivering flow in excess of that needed for cooling;
    further comprising two fans driven by two motors which are powered by the pump, and contained in a common duct, to cool a heat exchanger.

4. Improvement according to claim 3, wherein the two motors power fans contained in a common duct, which delivers cooling air to a heat exchanger.

5. A method of cooling a heat exchanger in a vehicle, using a fan which is powered by first and second hydraulic motors which are powered by a hydraulic pump, comprising the following steps:
    a) when flow rate produced by the pump is at a first fixed level,
        i) operating both motors when cooling demanded is relatively low; and
        ii) operating the first motor alone when the cooling demanded is relatively intermediate; and
    b) when flow rate produced by the pump is at a second fixed level, higher than the first,
        i) operating both motors under substantially all conditions of cooling demand.

6. In a hydraulically driven cooling system for a vehicle, the improvement comprising:
    a) a pump for providing a first flow;
    b) a first fan motor which is powered by a second flow, which is derived from the first flow; and
    c) a control system for
        i) ascertaining whether the first flow does not exceed the second flow and, if so, ii) powering a second fan motor, if a cooling demand signal allows.

7. A cooling system for engine coolant in a vehicle, comprising:
a) a hydraulic pump, producing fluid at a pressure P1;
b) a first valve which
 i) receives fluid from the hydraulic pump and
 ii) delivers fluid to a line at a flow rate which depends primarily on a cooling demand signal;
c) a fan,
 i) which is driven primarily by a hydraulic motor receiving fluid from the line at a pressure P2; and
 ii) is selectively supplemented by an auxiliary hydraulic motor;
d) a second valve, for
 i) receiving fluid from the line;
 ii) delivering fluid to the auxiliary hydraulic motor; and
 iii) controlling speed of the auxiliary motor, based on P1 and P2.

8. A cooling system for engine coolant in a vehicle, comprising:
a) a hydraulic pump;
b) first and second hydraulic motors, which drive one or more fans;
c) a first valve for
 i) receiving flow from the hydraulic pump, and
 ii) delivering a flow rate of hydraulic fluid which
  A) depends on a cooling demand signal, and
  B) is substantially independent of flow rate produced by the hydraulic pump; and
d) a second valve for allocating the flow delivered by the first valve between the first and second hydraulic motors, when excess flow is delivered to the first valve.

9. A cooling system for engine coolant in a vehicle, comprising:
a) a hydraulic pump;
b) first and second hydraulic motors, which drive one or more fans;
c) a control system, which
 i) receives hydraulic fluid from the hydraulic pump, and
 ii) when pump output is below a predetermined level, delivers hydraulic fluid
  A) to both hydraulic motors, when cooling demanded is relatively low; and
  B) to a single hydraulic motor, when cooling demanded is relatively high.

10. A cooling system for engine coolant in a vehicle, comprising:
a) a hydraulic pump (3);
b) a first control valve (6), which
 i) receives input fluid, at a first flow rate, from the hydraulic pump (3),
 ii) receives a cooling demand signal (73);
 iii) delivers output fluid to a first output line (75), at a second flow rate, which is controlled by the cooling demand signal (73); and
 iii) returns excess of the first flow rate over the second flow rate to a reservoir (15) which feeds the hydraulic pump (3);
c) a first hydraulic motor (9), which
 i) receives fluid from said first output line (75), and
 ii) drives a fan (12);
d) a second hydraulic motor (24);
e) a second control valve (18), which
 i) receives, at a first input, fluid from the hydraulic pump (3);
 ii) receives, at a second input, fluid from the first output line (75) of the first control valve (6); and
 iii) delivers fluid to a second output (82), when pressure at the first input exceeds pressure at the second input by a predetermined margin;
f) a fluid line connecting the second output (82) to the second hydraulic motor (24); and
g) a linkage which delivers power from the second hydraulic motor to the fan.

11. System according to claim 10, in which the linkage comprises an overrunning clutch.

12. System according to claim 10, in which the linkage comprises a direct coupling between the second hydraulic motor and the fan and a check valve accommodates differences between motor speeds.

13. A control system for first and second hydraulic devices in a vehicle which contains a hydraulic pump, comprising:
a) a first valve for receiving fluid from the pump and delivering flow at a rate controlled by a control signal; and
b) a second valve for allocating said flow between said devices, based on predetermined operating conditions of the first valve;
further comprising two fans, driven by the two devices and contained in a common duct which cool a heat exchanger.

* * * * *